US005450068A

United States Patent [19]

Steffen

[11] Patent Number: 5,450,068

[45] Date of Patent: Sep. 12, 1995

[54] INFRARED REMOTE CONTROL FOR SOIL COMPACTING DEVICES

[75] Inventor: Michael Steffen, Gauting, Germany

[73] Assignee: Wacker Werke GmbH & Co. KG, München, Germany

[21] Appl. No.: 82,667

[22] Filed: Jun. 24, 1993

[30] Foreign Application Priority Data

Jul. 3, 1992 [DE] Germany ........................ 42 21 793.8

[51] Int. Cl.[6] ........................ A01B 67/00; G08C 19/14

[52] U.S. Cl. .................................... 340/825.03; 172/2; 172/3; 340/825.72; 340/825.77

[58] Field of Search ....................... 340/825.69, 825.71, 340/825.72, 825.03, 825.77; 455/59, 66; 172/2, 3

[56] References Cited

U.S. PATENT DOCUMENTS

| | | | |
|---|---|---|---|
| 4,057,805 | 11/1977 | Dowling | 340/825.72 |
| 4,109,186 | 8/1978 | Parque | 340/825.77 |
| 4,135,144 | 1/1979 | Elmasian | 340/825.77 |
| 4,751,396 | 6/1988 | Daigle et al. | 340/825.72 |
| 4,843,384 | 6/1989 | Ide et al. | 340/825.72 |
| 5,193,210 | 3/1993 | Nicholas et al. | 340/825.69 |

*Primary Examiner*—Donald J. Yusko
*Assistant Examiner*—David Yink Jung
*Attorney, Agent, or Firm*—Robert W. Becker & Associates

[57] ABSTRACT

An infrared remote-controlled soil compacting device is controlled such that the device cannot be set into operation as long as the operator with the sending unit is within close vicinity of the soil compacting device so that an accidental operation or propelling in the wrong direction is prevented. This is achieved by providing an infrared close range radiation in addition to the infrared control radiation required for the operational control of the device. The close range radiation has a substantially reduced intensity relative to the control radiation so that the close range radiation can be received within the receiving unit only within close vicinity of the sending unit. When the close range radiation is received within the receiving unit the generation or release of electric signals affecting propelling of the soil compacting device is suppressed.

17 Claims, 2 Drawing Sheets

INFRARED REMOTE CONTROL FOR SOIL COMPACTING DEVICES

BACKGROUND OF THE INVENTION

The present invention relates to a method for remote-controlling a self-propelled soil compacting device wherein an electromagnetic control radiation is emitted in the infrared range from a sending unit that is separate from the soil compacting device. The electromagnetic control radiation is modulated to produce a modulated electromagnetic control radiation in correspondence to an electric control signal to be transmitted to the soil compacting device, the electromagnetic control radiation being received at a receiving unit provided at the soil compacting device. An electric control signal corresponding to the modulated electromagnetic control radiation is generated within the receiving unit and controls the soil compacting device. The present invention further relates to a control device for performing the aforementioned method.

Methods of the aforementioned kind are known. They allow the control of a soil compacting device from a remote location with respect to such functions as forward drive, reverse drive, operating at the location, switching on and off the drive motor etc. A remote controlling of the compacting device has the advantage that the operator must not be positioned in the direct vicinity of the soil compacting device where he would be exposed to and endangered by considerable noise and dust pollution.

With the known remote controls it is however easily possible that the soil-compacting device is accidentally set into motion or moved or directed into the wrong direction. This is especially dangerous when the operator is in the direct vicinity of the soil compacting device because then the risk arises that he be run over by the device.

It is therefore an object of the present invention to provide an improved method of the aforementioned kind with which an accidental operation with respect to the aforedescribed different functions, which are dangerous to the operator in the direct vicinity of the soil compacting device, are reliably prevented as long as the operator is not positioned at a safe distance from the device.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
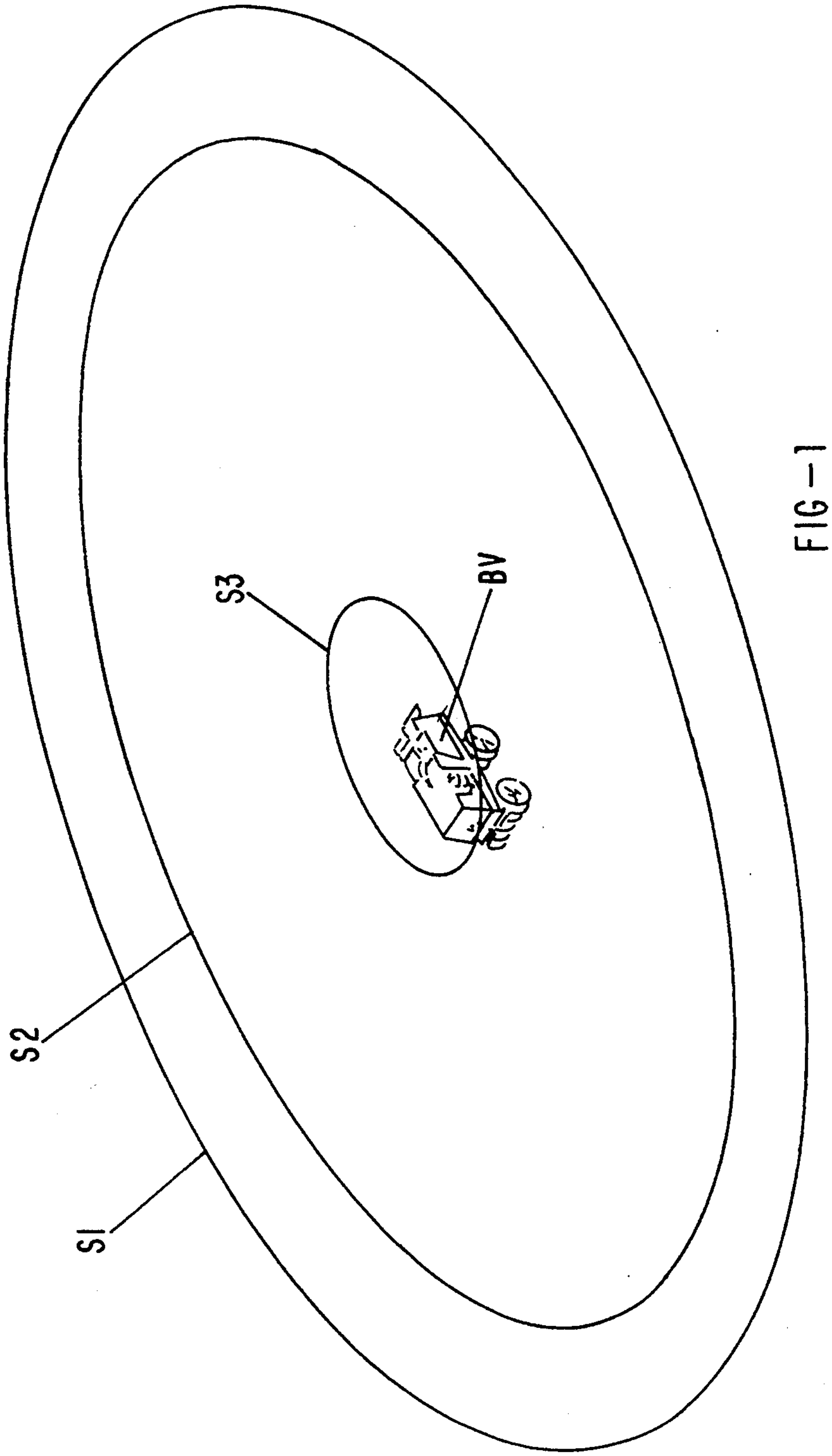
FIG. 1 shows a perspective schematic representation of the soil compacting device with concentric lines identifying certain distance ranges.

The inventive method of remote-controlling a self-propelled soil compacting device comprises the following steps:

Emitting an electromagnetic control radiation in the infrared range from a sending unit that is separate from the soil compacting device;

Modulating the electromagnetic control radiation to produce a modulated electromagnetic control radiation in correspondence to an electric control signal to be transmitted to the soil compacting device;

Receiving the electromagnetic control radiation at a receiving unit provided at the soil compacting device;

Generating the electric control signal corresponding to the modulated electromagnetic control radiation for controlling the soil compacting device;

Sending alternatingly with the electromagnetic control radiation an electromagnetic short range radiation in the infrared range having an intensity that is substantially smaller than the intensity of the electromagnetic control radiation;

Coating into the electromagnetic control radiation a first address code and into the electromagnetic short range radiation a second address code, wherein the first and the second address codes differ from one another and are decoded within the receiving unit;

Directing the electromagnetic control radiation according to the first address code into a first channel and the electromagnetic short range radiation according to the second address code into a second channel, wherein the first channel is blocked for the electromagnetic short range radiation and the second channel is blocked for the electromagnetic control radiation; and Blocking with the electromagnetic short range radiation the release of predetermined control signals within the receiving unit, when the electromagnetic short range radiation is received within the receiving unit with an intensity that is above a predetermined threshold. Preferably, at least those control signals are blocked that control propelling of the soil compacting device.

In a further embodiment of the present invention the method further comprises the steps of:

Sending in addition to the electromagnetic control radiation and the electromagnetic short range radiation an electromagnetic long range radiation in the infrared range having an intensity that is smaller than the intensity of the electromagnetic control radiation and greater than the intensity of the electromagnetic short range radiation, wherein the electromagnetic control radiation, the electromagnetic short range radiation, and the electromagnetic long range radiation are being sent sequentially;

Coding into the electromagnetic long range radiation a third address code, wherein the third address code differs from the first and the second address codes and is decoded within the receiving unit;

Directing the electromagnetic long range radiation according to the third address code into a corresponding third channel that is blocked for the electromagnetic control radiation and for the electromagnetic short range radiation; and Blocking with the electromagnetic long range radiation the release of predetermined control signals within the receiving unit, when the electromagnetic long range radiation is received within the receiving unit with an intensity that is below a predetermined threshold. Preferably, at least the control signals are blocked that control propelling of the soil compacting device.

The electromagnetic short range radiation of a substantially reduced intensity as compared to the electromagnetic control radiation emitted by the sending unit reaches the receiving unit at the soil compacting device only when sufficient intensity for reception is present, i.e., when the operator with the sending unit is in the vicinity of the soil compacting device. When this electromagnetic short range radiation is received, the generation of the electric control signal, that the operator wishes to send for controlling the functions or operations of the soil compacting device and within the short range that present a risk to the operator, is prevented within the receiving unit so that the operator cannot initiate dangerous operations with the electromagnetic control radiation as long as he is within a certain distance from the device.

With the additional long range radiation it is prevented that the soil compacting device can exit from the receiving range of the remote control into an area where it would not be controllable before the intensity of the control radiation is reduced to such an extent, due to the distance between the receiving unit and the sending unit being too great, that a safe reception is no longer ensured.

When dangerous signals are being blocked, the other functions of the device remain controllable via the control radiation, so that, for example, the drive motor can still be turned on and off after the soil compacting device has been immobilized due to a no longer sufficient reception of the remote control signals or due to the distance to the sending unit being too short.

The device for remote-controlling a self-propelled soil compacting device according to the aforedescribed inventive method is primarily characterized by:

A sending unit that is separate from the soil compacting device and has a means for emitting an electromagnetic control radiation in the infrared range and a means for modulating the electromagnetic control radiation to produce a modulated electromagnetic control radiation in correspondence to an electric control signal to be transmitted to the soil compacting device;

A receiving unit provided at the soil compacting device having a means for receiving the electromagnetic control radiation and a means for generating the electric control signal corresponding to the modulated electromagnetic control radiation for controlling the soil compacting device;

The sending unit comprising a means for emitting an electromagnetic short range radiation in the infrared range having an intensity that is substantially smaller than an intensity of the electromagnetic control radiation and a means for sending alternatingly the electromagnetic control radiation and the electromagnetic short range radiation;

The sending unit further comprising means for coating into the electromagnetic control radiation a first address code and a means for coding into the electromagnetic short range radiation a second address code, wherein the first and the second address codes differ from one another;

The receiving unit comprising means for receiving the electromagnetic short range radiation and means for differentiating between the electromagnetic control radiation and the electromagnetic short range radiation; and The receiving unit further comprising means for blocking with the electromagnetic short range radiation the release of predetermined control signals within the receiving unit.

In a preferred embodiment of the present invention, the sending unit further comprises: a means for emitting in addition to the electromagnetic control radiation and the electromagnetic short range radiation an electromagnetic long range radiation in the infrared range having an intensity that is smaller than the intensity of the electromagnetic control radiation and greater than the intensity of the electromagnetic short range radiation; a means for sending sequentially the electromagnetic control radiation, the electromagnetic short range radiation, and the electromagnetic long range radiation; and a means for coding into the electromagnetic long range radiation a third address code, wherein the third address code differs from the first and second address codes.

The receiving unit further comprises: a means for receiving the electromagnetic long range radiation; a means for differentiating the electromagnetic long range radiation from the electromagnetic control radiation and the electromagnetic short range radiation; and a means for blocking with the electromagnetic long range radiation the release of predetermined control signals within the receiving unit, when the electromagnetic long range radiation is received within the receiving unit with insufficient intensity.

Preferably, the means for emitting the electromagnetic control radiation is a first diode, the means for emitting the electromagnetic short range radiation is a second diode, and the means for emitting the electromagnetic long range radiation is a third diode.

Advantageously, the means for modulating the electromagnetic control radiation as a switching device. Expediently, the means for receiving the electromagnetic control radiation, the means for receiving the electromagnetic short range radiation, and the means for receiving the electromagnetic long range radiation are in the form of a single infrared detector.

In a preferred embodiment of the present invention, the means for generating the electric control signal comprises a logic circuit.

In another embodiment of the present invention, the means for sending sequentially the electromagnetic control radiation, the electromagnetic short range radiation, and the electromagnetic long range radiation is a ring counter.

Preferably, the means for coding into the electromagnetic control radiation the first address code is a coding device.

Advantageously, the means for coding into the electromagnetic short range radiation the second address code and the means for coding into the electromagnetic long range radiation the third address code are hardwired connections.

Expediently, the means for differentiating between the electromagnetic control radiation and the electromagnetic short range radiation and the means for differentiating between the electromagnetic long range radiation and the electromagnetic control radiation as well as the electromagnetic short range radiation comprise integrated circuits responding to the first, the second, and the third address codes.

Advantageously, the means for blocking with the electromagnetic short range radiation and the means for blocking with the electromagnetic long range radiation have a common comparator.

Expediently, the means for emitting the electromagnetic control radiation, the means for emitting the electromagnetic short range radiation, and the means for emitting the electromagnetic long range radiation are in the form of a single diode.

Advantageously, the means for sending alternatingly the electromagnetic control radiation and the electromagnetic short range is a ring counter.

DESCRIPTION OF PREFERRED EMBODIMENTS

FIG. 1 shows schematically in a perspective representation a soil compacting device BV, in the shown example, a soil compacting roller, as well as concentric lines S1, S2 and S3 which define distance ranges. It is presumed that an operator with the infrared sending unit for controlling the soil compacting device BV is positioned at the center of the lines S1 to S3. The line S3 defines a short distance range about the operator in which a soil compacting device which is in motion, especially accidentally, is dangerous to the operator. Between the lines S3 and S2 the normal operating range of the soil compacting device that is safe for the operator is delimited, and in the area outside of the line S1, but only from that line on, the infrared radiation via which the soil compacting device BV is functionally controlled can no longer be received properly by the receiving unit at the soil compacting device.

Figure 2:
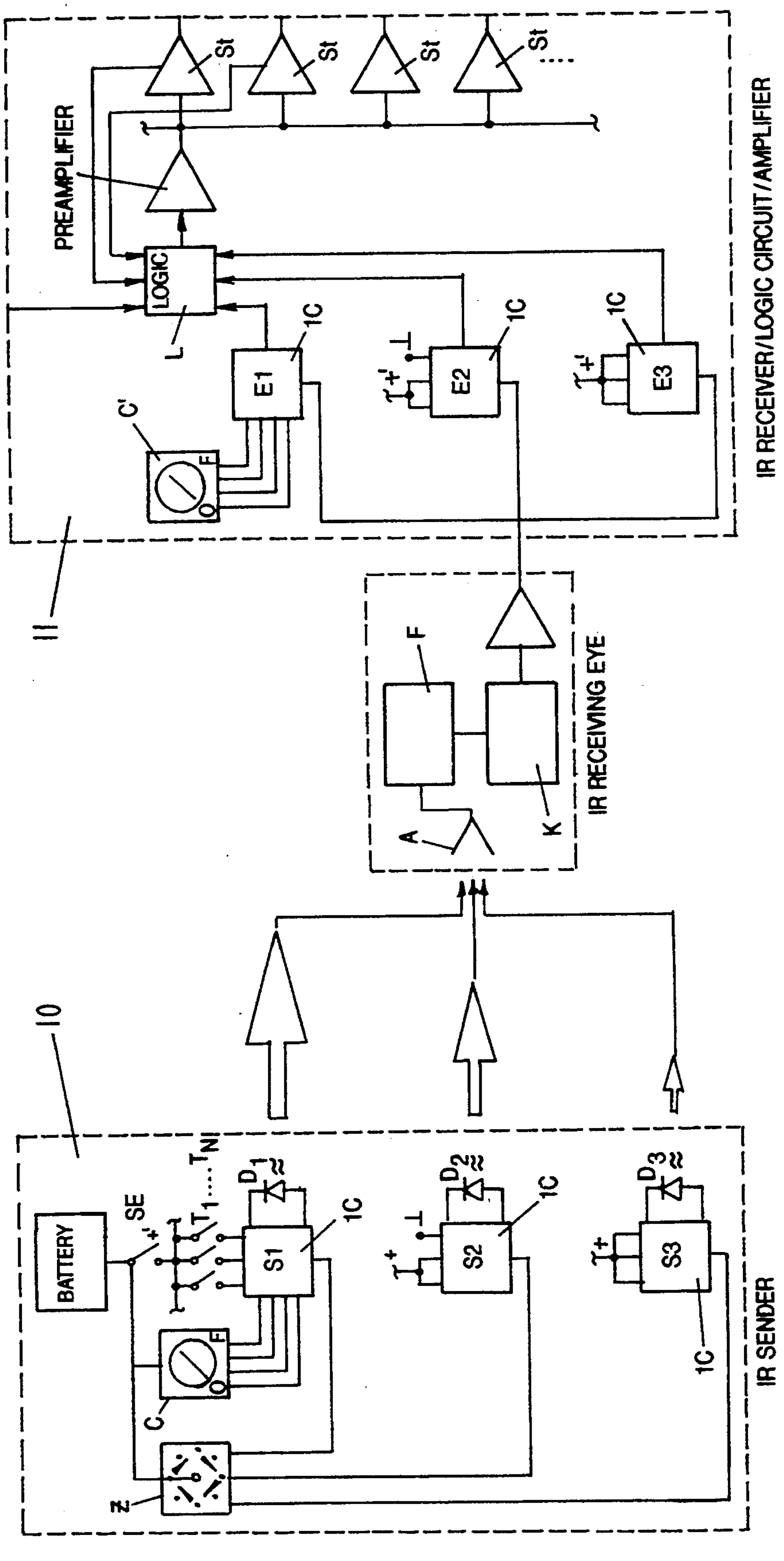
FIG. 2 shows a schematic circuit diagram of a first embodiment of a suitable infrared remote control for performing the inventive method.

FIG. 2 shows schematically an inventive embodiment of an infrared remote-control device for performing the inventive method.

The remote control device according to FIG. 2 is comprised of a sending unit 10 and a receiving unit 11.

The sending unit 10 can be operated by the operator. The sending unit has three diodes D1, D2 and D3 which are emitting infrared radiation and which are sequentially controlled by the integrated circuits ICs S1, S2 and S3. These ICs are sequentially and periodically activated by a ring counter Z and supply the corresponding diode with alternating current of a predetermined frequency. Each one of the ICs codes the generated alternating current with a corresponding address code which differs from IC to IC. The alternating infrared light emitted by the diode D1 thus also contains a particular address code. The IC S1 provides the address code in cooperation with a coding device C with which it is possible for a certain sending unit 10 to select one of a plurality of address codes for the IC S1 so that it is possible to adjust a plurality of sending units 10, operating in close vicinity to one another, such that they cannot influence one another in the sense that they affect other receiving units 11 not corresponding to the proper sending unit 10.

In contrast, the address codes for the ICs S2 and S3 are hard-wired connections.

In addition to the address code the IC S1 can be coded with a plurality of different data codes for transmitting various operating commands to the soil compacting device BV. The operator can select one of the operating commands with a switching device SE by activating a corresponding key $T_1$ to $T_N$. The coded data signal generates within the receiving unit 11 connected to the soil compacting device a corresponding electrical control signal that activates a certain function of the soil compacting device.

The reception intensity of the electromagnetic radiation emitted by the diodes D1, D2, and D3 at the receiving unit is reduced with increasing distance of the receiving unit 11 from the sending unit 10.

The diode D1 emits infrared light of a greater intensity than the diode D2 and the infrared light emitted by the diode D2 has a greater intensity than the infrared light emitted from the diode D3. The infrared radiation emitted from the diode D1, which, as mentioned above, contains not only the corresponding address code, but also a code for the control data to be received by the receiving unit 11, is the electromagnetic control radiation for the soil compacting device BV to be controlled. In contrast, the infrared radiation emitted by the diodes D2 and D3, which only contain the respective address code, serve as electromagnetic radiations which due to the intensity with which they are received within the receiving unit 11 determines the distance of the receiving unit 11 from the sending unit 10. Due to the different intensity with which the radiation is emitted from the sending unit 10, the distance at which the respective radiation can be received at the receiving unit 11 differs. The radiation emitted from the diode D3 can be received only within a very short range from the sending unit 10 by the receiving unit 11, for example, up to the line S3 in FIG. 1. On the other hand, the radiation emitted from the diode D2 can be received a substantially greater distance from the sending unit 10 by the receiving unit 11, for example, up to the line S2 represented in FIG. 1. The radiation emitted from the diode D1 can be received by the receiving unit 11 at an even greater distance from the sending unit, for example, up to the line S1 in FIG. 1.

As long as the infrared radiation emitted by the diode D3 can be received by the receiving unit 11, certain commands within the receiving unit 11 which are sent by the diode D1 for generating respective control signals within the receiving unit 1, are suppressed. Such a suppression of control signals also occurs when the radiation emitted from the diode D2 can no longer be received by the receiving unit 11. Then at least those control signals are suppressed which control the propelling of the soil compacting device so that when the distance between the receiving unit 11, i.e., the soil compacting device, from the sending unit 10 is too short and when the distance between the two is too great, the soil compacting device cannot be propelled or is immobilized. In each case, however, the control radiation can still be received by the receiving unit 11 so that the remaining operating commands can still be performed. The radiation emitted from the diodes D2 and D3 therefore serve as a marking of the short range (diode D3) and of the long range (diode D2). The infrared radiation emitted by the diodes thus represents the electromagnetic short range radiation, respectively, electromagnetic long range radiation whose reception intensity thus controls certain control commands.

The receiving unit 11 has a so-called infrared "eye" A for receiving the radiation emitted by the diodes D1, D2, and D3. The eye generates current corresponding to the respectively received radiation. This current passes through a frequency filter F in order to eliminate disturbing foreign light of other frequencies than that of the control radiation, the short range radiation and the long range radiation.

From the frequency filter F the current is passed through a comparator K that checks the magnitude of the current corresponding to the intensity of the received radiation. The comparator K releases a signal only when this intensity surpasses a certain threshold value. The current sent by the comparator, due to the address codes contained therein, activates the respective one of the three ICs E1, E2, and E3 which cooperate individually with the ICs S1, S2, S3 of the sending unit 10. With the coding device C′ the IC E1 is adjusted to the same address code as the IC S1 in the sending unit 10, and the ICs E2 and E3 have the same address codes hard-wired thereto as the ICs S2 and S3.

The signals sent from the ICS E1, E2, and E3 are combined in the logic circuit L such that the aforedescribed control signal generation and suppression is a function of the data signals within the control radiation and the reception intensity of the close range radiation and the long range radiation is performed. The logic circuit L thus supplies the corresponding electrical control signals to the control units St which execute the corresponding command within the soil compacting device BV.

Since the light emitting diodes D1, D2 and D3 are sequentially controlled, it is also possible to replace the three diodes with a single infrared-emitting diode which is controlled by all ICs S1, S2 and S3.

The present invention is, of course, in no way restricted to the specific disclosure of the specification and drawings, but also encompasses any modifications within the scope of the appended claims.

What I claim is:

1. A method of remote-controlling a self-propelled soil compacting device, said method comprising the steps of:

emitting an electromagnetic control radiation in the infrared range from a sending unit that is separate from the soil compacting device;

modulating the electromagnetic control radiation to produce a modulated electromagnetic control radiation in correspondence to an electric control signal to be transmitted to the soil compacting device;

receiving the electromagnetic control radiation at a receiving unit provided at the soil compacting device;

generating the electric control signal corresponding to the modulated electromagnetic control radiation for controlling the soil compacting device;

sending alternatingly with the electromagnetic control radiation an electromagnetic short range radiation in the infrared range having an intensity that is substantially smaller than the intensity of the electromagnetic control radiation;

coding into the electromagnetic control radiation a first address code and into the electromagnetic short range radiation a second address code, wherein the first and the second address codes differ from one another and are decoded within the receiving unit;

directing the electromagnetic control radiation according to the first address code into a first channel and the electromagnetic short range radiation according to the second address code into a second channel, wherein the first channel is blocked for the electromagnetic short range radiation and the second channel is blocked for the electromagnetic control radiation; and blocking with the electromagnetic short range radiation the release of predetermined control signals within the receiving unit, when the electromagnetic short range radiation is received within the receiving unit with an intensity that is above a predetermined threshold.

2. A method according to claim 1, wherein at least the control signals are blocked that control propelling of the soil compacting device.

3. A method according to claim 1, further comprising the steps of:

sending in addition to the electromagnetic control radiation and the electromagnetic short range radiation an electromagnetic long range radiation in the infrared range having an intensity that is smaller than the intensity of the electromagnetic control radiation and greater than the intensity of the electromagnetic short range radiation, wherein the electromagnetic control radiation, the electromagnetic short range radiation, and the electromagnetic long range radiation are being sent sequentially;

coding into the electromagnetic long range radiation a third address code, wherein the third address code differs from the first and the second address codes and is decoded within the receiving unit;

directing the electromagnetic long range radiation according to the third address code into a corresponding third channel that is blocked for the electromagnetic control radiation and for the electromagnetic short range radiation; and blocking with the electromagnetic long range radiation the release of predetermined control signals within the receiving unit, when the electromagnetic long range radiation is received within the receiving unit with an intensity that is below a predetermined threshold.

4. A method according to claim 3, wherein at least the control signals are blocked that control propelling of the soil compacting device.

5. A device for remote-controlling a self-propelled soil compacting device, said device comprising:

a sending unit that is separate from the soil compacting device, said sending unit having a means for emitting an electromagnetic control radiation in the infrared range and a means for modulating said electromagnetic control radiation to produce a modulated electromagnetic control radiation in correspondence to an electric control signal to be transmitted to the soil compacting device;

a receiving unit provided at the soil compacting device, said receiving unit having a means for receiving said electromagnetic control radiation and a means for generating the electric control signal corresponding to the modulated electromagnetic control radiation for controlling the soil compacting device;

said sending unit comprising means for emitting an electromagnetic short range radiation in the infrared range having an intensity that is substantially smaller than an intensity of said electromagnetic control radiation and a means for sending alternatingly said electromagnetic control radiation and said electromagnetic short range radiation;

said sending unit further comprising means for coding into said electromagnetic control radiation a first address code and a means for coding into said electromagnetic short range radiation a second address code, wherein said first and said second address codes differ from one another;

said receiving unit further comprising means for receiving said electromagnetic short range radiation and means for differentiating between said electromagnetic control radiation and said electromagnetic short range radiation; and said receiving unit further comprising means for blocking with said electromagnetic short range radiation the release of predetermined control signals within said receiving unit.

6. A device according to claim 5, wherein;

said sending unit further comprises:

1) a means for emitting in addition to said electromagnetic control radiation and said electromagnetic short range radiation an electromagnetic long range radiation in the infrared range having an intensity that is smaller than said intensity of said electromagnetic control radiation and greater than said intensity of said electromagnetic short range radiation;
2) a means for sending sequentially said electromagnetic control radiation, said electromagnetic short range radiation, and said electromagnetic long range radiation; and
3) a means for coding into said electromagnetic long range radiation a third address code, wherein said third address code differs from said first and said second address codes;

and wherein said receiving unit further comprises:

1) a means for receiving said electromagnetic long range radiation;
2) a means for differentiating said electromagnetic long range radiation from said electromagnetic control radiation and said electromagnetic short range radiation; and
3) a means for blocking with said electromagnetic long range radiation the release of predetermined control signals within said receiving unit, when said electromagnetic long range radiation is received within said receiving unit with insufficient intensity.

7. A device according to claim 6, wherein said means for emitting said electromagnetic control radiation is a first diode, said means for emitting said electromagnetic short range radiation is a second diode, and said means for emitting said electromagnetic long range radiation is a third diode.

8. A device according to claim 6, wherein said means for modulating said electromagnetic control radiation is a switching device.

9. A device according to claim 6, wherein said means for receiving said electromagnetic control radiation, said means for receiving said electromagnetic short range radiation, and said means for receiving said electromagnetic long range radiation are in the form of a single infrared detector.

10. A device according to claim 6, wherein said means for generating the electric control signal comprises a logic circuit.

11. A device according to claim 6, wherein said means for sending sequentially said electromagnetic control radiation, said electromagnetic short range radiation, and said electromagnetic long range radiation is a ring counter.

12. A device according to claim 6, wherein said means for coding into said electromagnetic control radiation said first address code is a coding device.

13. A device according to claim 6, wherein said means for coding into said electromagnetic short range radiation said second address code and said means for coding into said electromagnetic long range radiation said third address code are hard-wired connections.

14. A device according to claim 6, wherein said means for differentiating between said electromagnetic control radiation and said electromagnetic short range radiation and said means for differentiating between said electromagnetic long range radiation and said electromagnetic control radiation as well as said electromagnetic short range radiation comprise integrated circuits responding to said first, second, and third address codes.

15. A device according to claim 6, wherein said means for blocking with said electromagnetic short range radiation and said means for blocking with said electromagnetic long range radiation have a common comparator.

16. A device according to claim 6, wherein said means for emitting said electromagnetic control radiation, said means for emitting said electromagnetic short range radiation, and said means for emitting said electromagnetic long range radiation are in the form of a single diode.

17. A device according to claim 5, wherein said means for sending alternatingly said electromagnetic control radiation and said electromagnetic short range radiation is a ring counter.

* * * * *